(12) United States Patent  (10) Patent No.: US 6,622,989 B2
Schiesser  (45) Date of Patent: Sep. 23, 2003

(54) CONVEYOR TRANSFER LIFT BOX

(75) Inventor: Ricardo N. Schiesser, Rockford, MI (US)

(73) Assignee: Rapistan Systems Advertising Corp., Grand Rapids, MI (US)

( * ) Notice: Subject to any disclaimer, the term of this patent is extended or adjusted under 35 U.S.C. 154(b) by 0 days.

(21) Appl. No.: 09/978,909

(22) Filed: Oct. 16, 2001

(65) Prior Publication Data
US 2002/0063021 A1 May 30, 2002

Related U.S. Application Data
(60) Provisional application No. 60/240,798, filed on Oct. 16, 2000.

(51) Int. Cl.[7] ............................................... B66F 3/00
(52) U.S. Cl. .................. 254/124; 254/45; 254/93 H
(58) Field of Search ............................. 254/93 H, 124, 254/126, 133 R, 134, 89 H, 2 R, 2 B, 2 C, 45

(56) References Cited

U.S. PATENT DOCUMENTS

| | | | | |
|---|---|---|---|---|
| 3,645,501 A | * | 2/1972 | Musgrove | 254/126 |
| 3,698,423 A | | 10/1972 | Dahlquist et al. | 137/454.2 |
| 3,724,642 A | | 4/1973 | De Good | 198/127 R |
| 3,768,630 A | | 10/1973 | Inwood et al. | 198/127 R |
| 3,994,474 A | * | 11/1976 | Finkbeiner | 254/88 |
| 4,706,343 A | * | 11/1987 | Neidigk | 254/93 H |
| 4,730,718 A | | 3/1988 | Fazio et al. | 198/372 |
| 4,941,797 A | * | 7/1990 | Smillie, III | 414/462 |
| 4,962,841 A | | 10/1990 | Kloosterhouse | 198/372 |
| 5,016,858 A | * | 5/1991 | Mitchell | 254/122 |
| 5,156,355 A | * | 10/1992 | Wadle | 254/134.3 R |
| 5,738,203 A | | 4/1998 | Crorey | 198/463.3 |
| 5,868,379 A | * | 2/1999 | Ellis | 254/124 |
| 6,102,355 A | | 8/2000 | Rood | 248/425 |
| 6,216,847 B1 | | 4/2001 | Schmidt | 198/463.3 |

FOREIGN PATENT DOCUMENTS

EP 1034879 A1 9/2000

* cited by examiner

Primary Examiner—Lee D. Wilson
(74) Attorney, Agent, or Firm—Van Dyke, Gardner, Linn & Burkhart, LLP

(57) ABSTRACT

A lift assembly for raising and lowering a load includes a first member, which is adapted for resting on a reference surface, and a second member, which defines a support surface for supporting a load. The lift assembly also includes a drive assembly, which selectively moves the second member relative to the first member from an initial position to a final position to raise or lower the second member relative to the first member. The drive assembly is adapted to move the second member from the initial position at a progressively increasing speed to an intermediate position and after which at a progressively decreasing speed until the second member is moved to the final position.

29 Claims, 11 Drawing Sheets

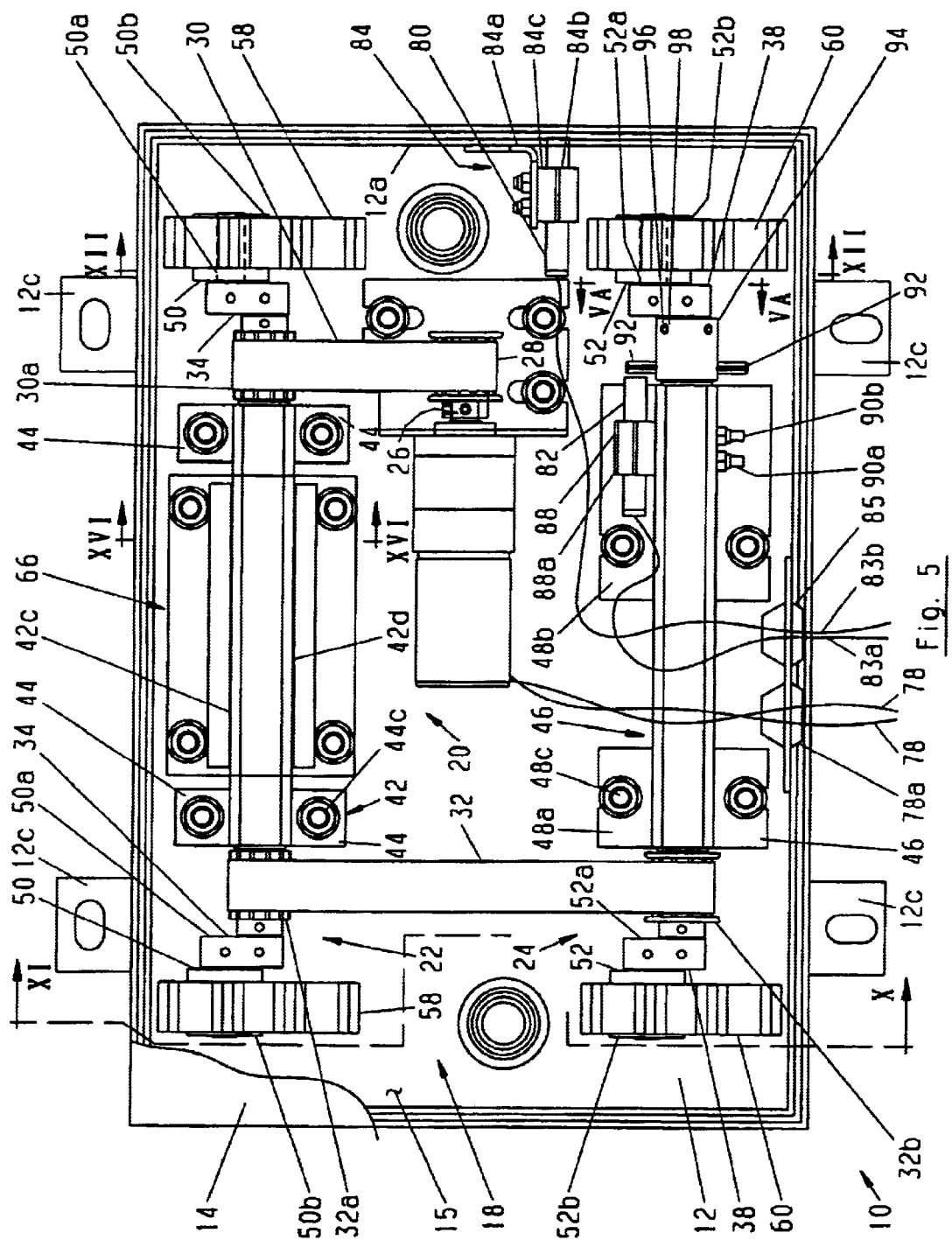

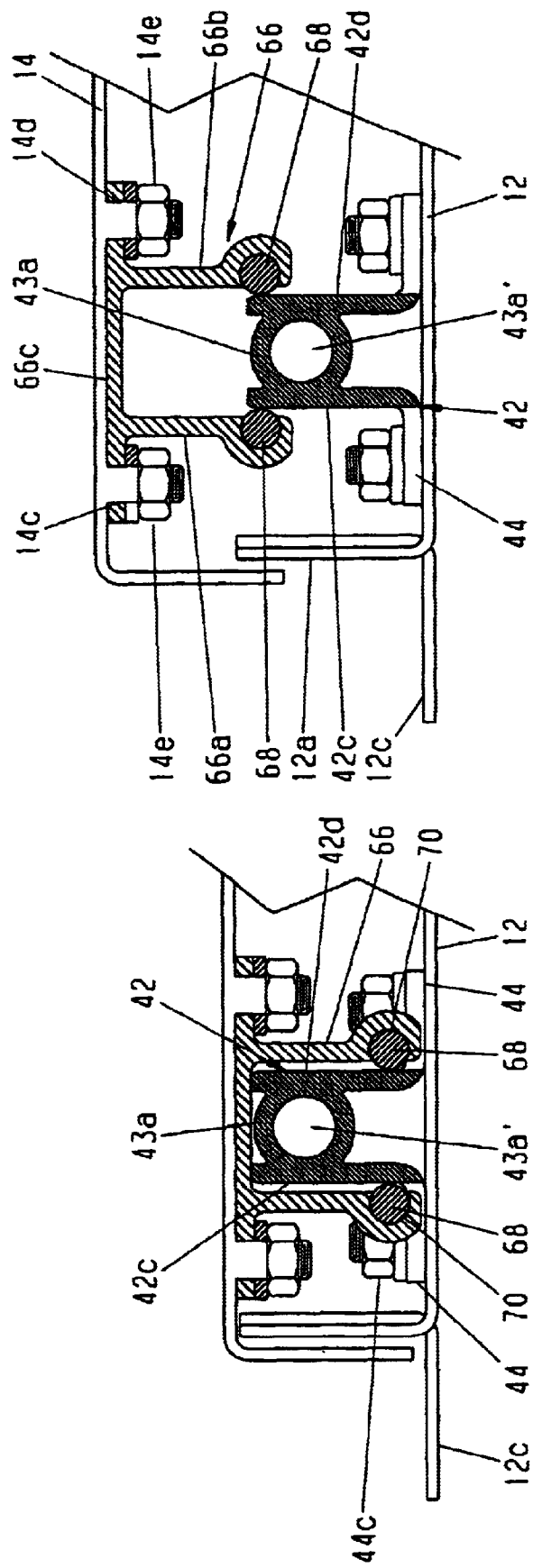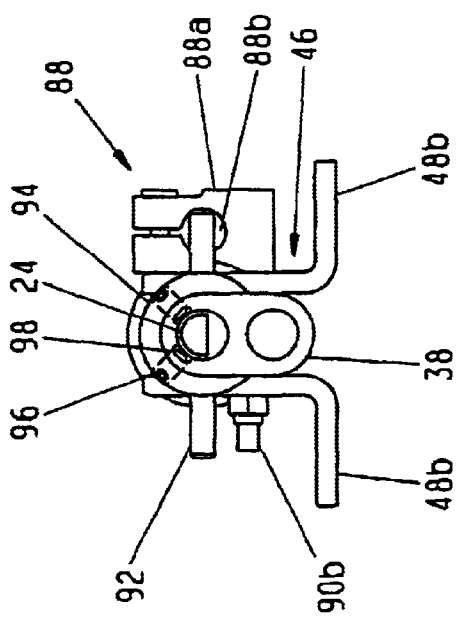

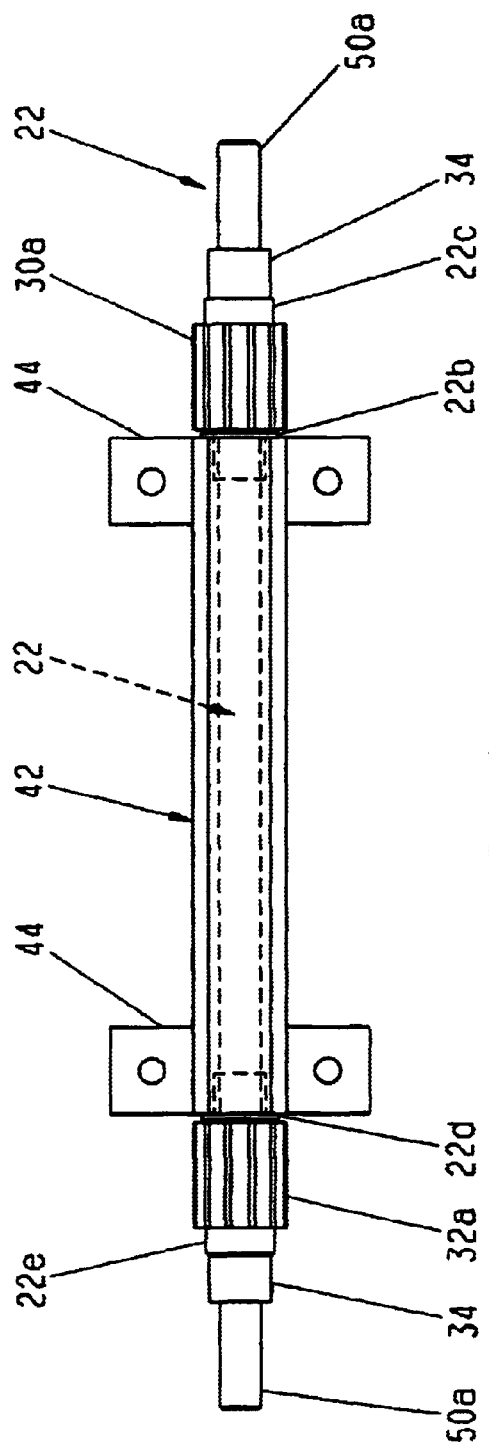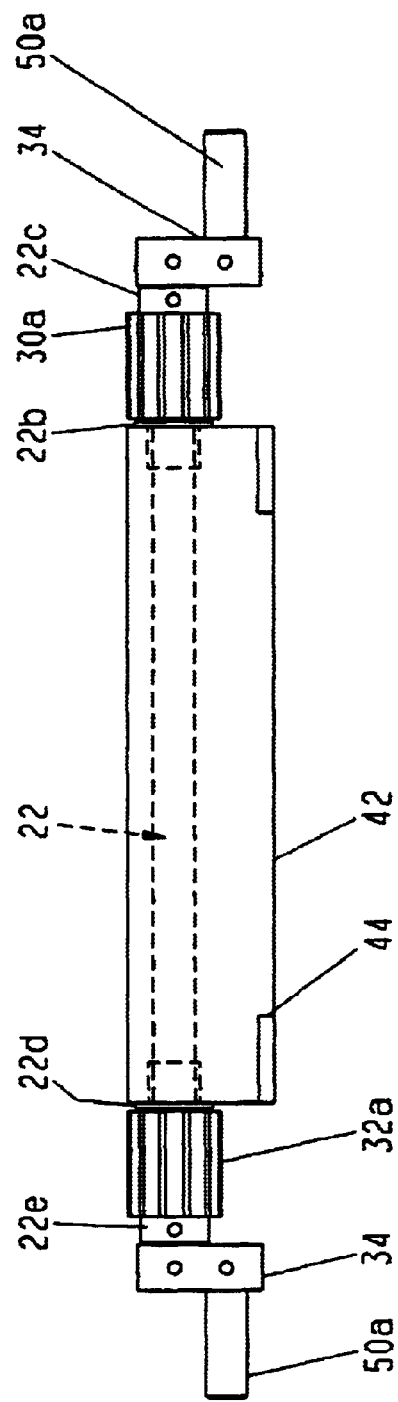

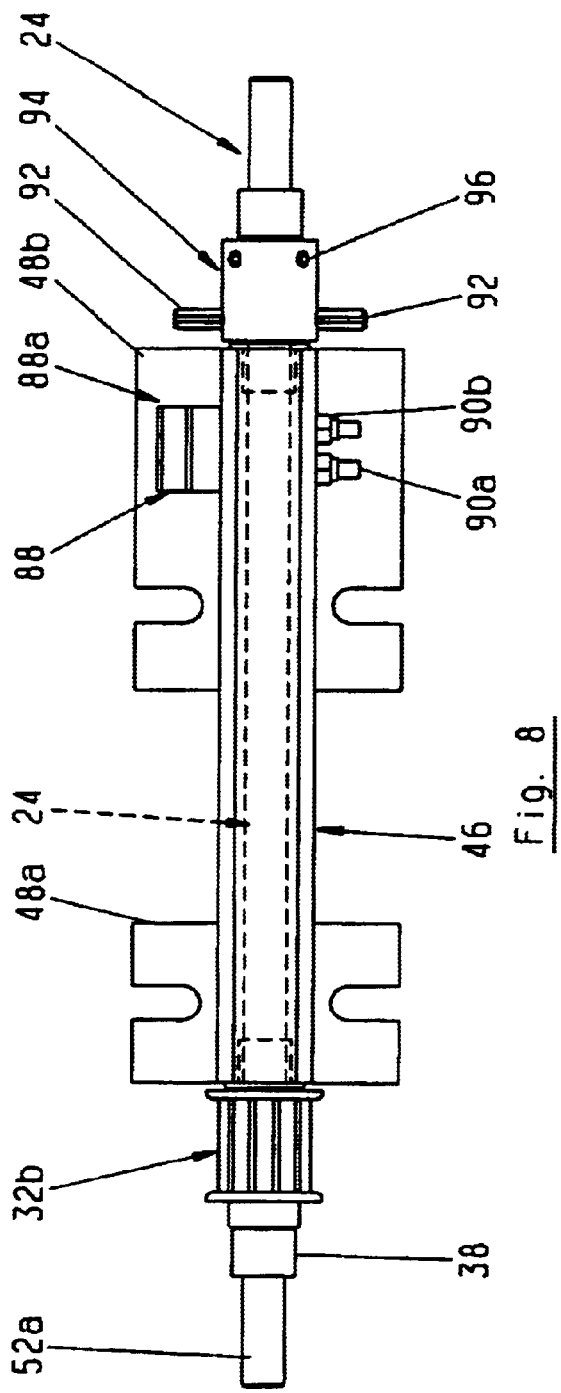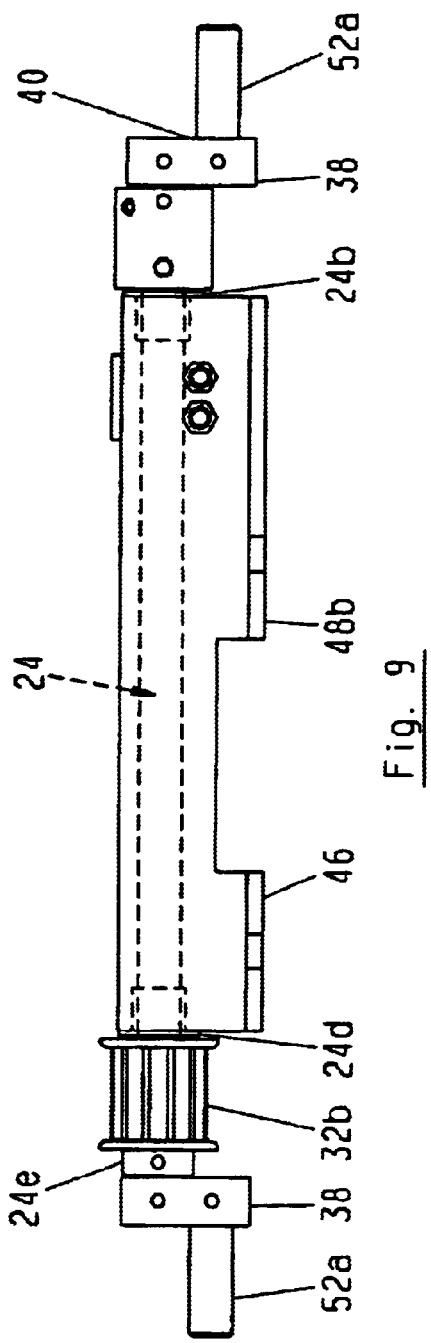

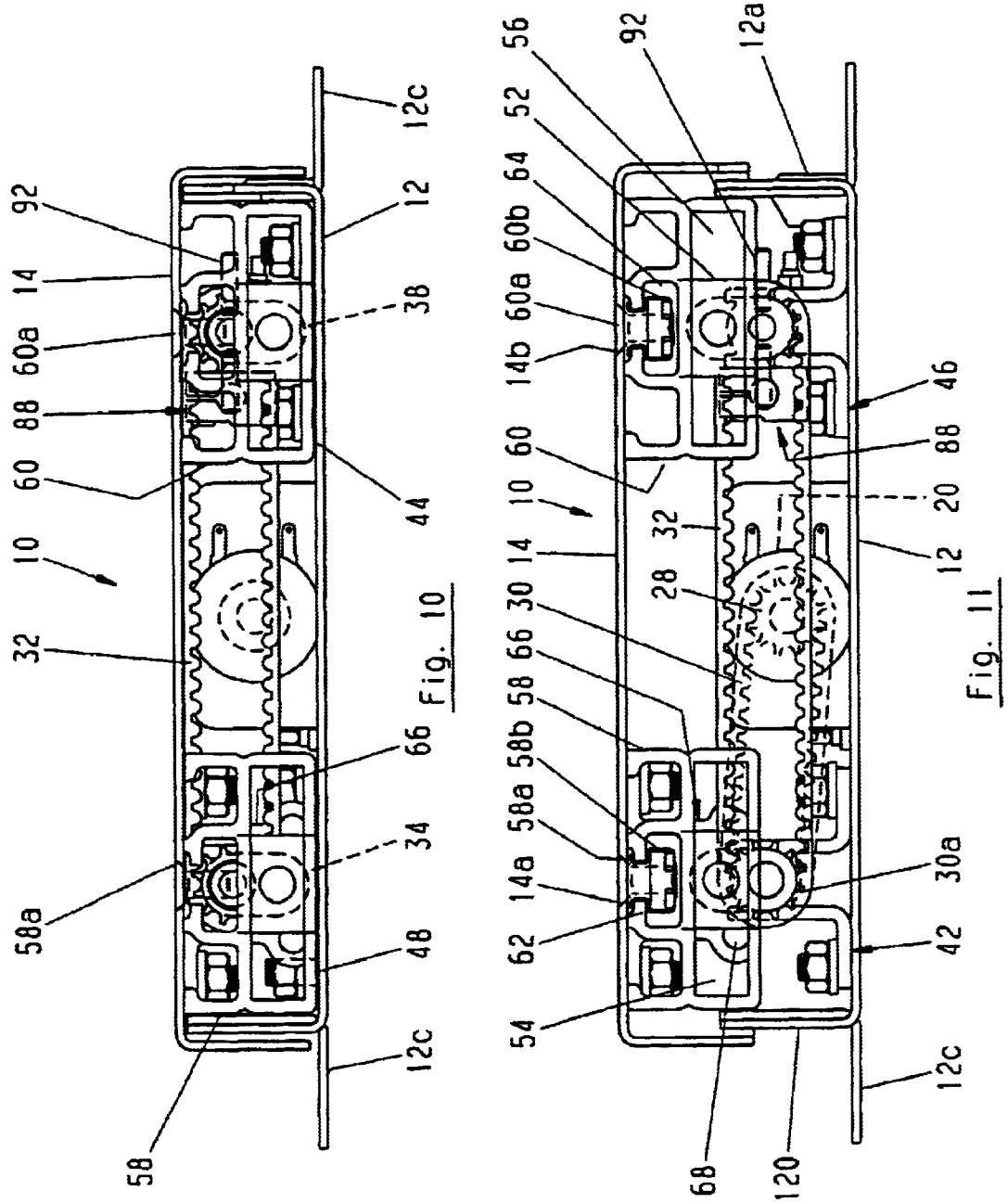

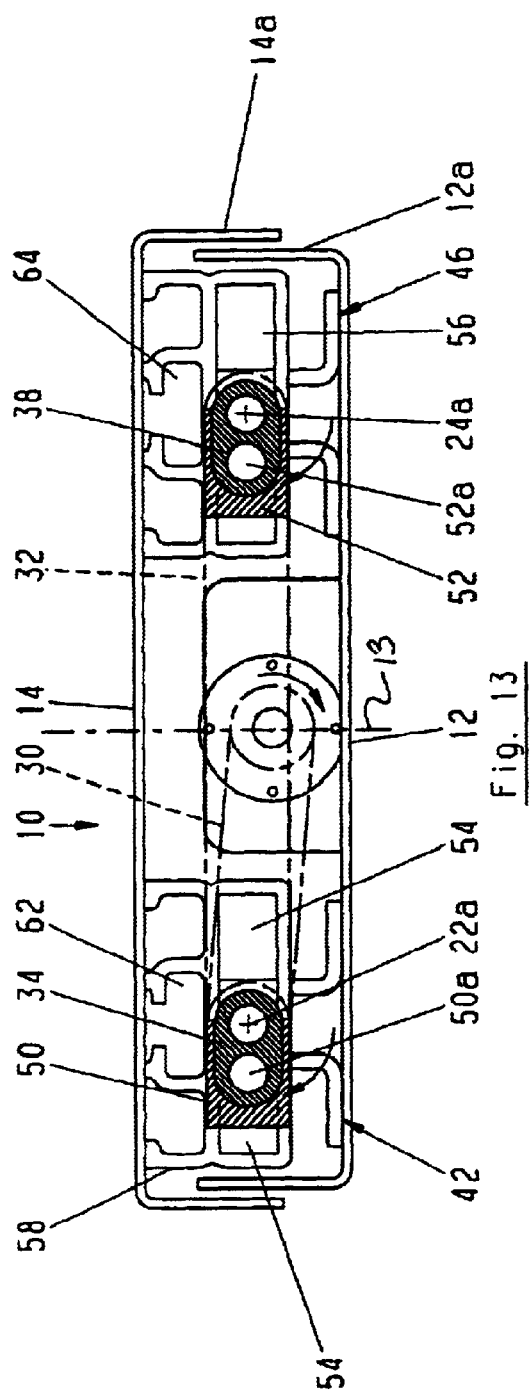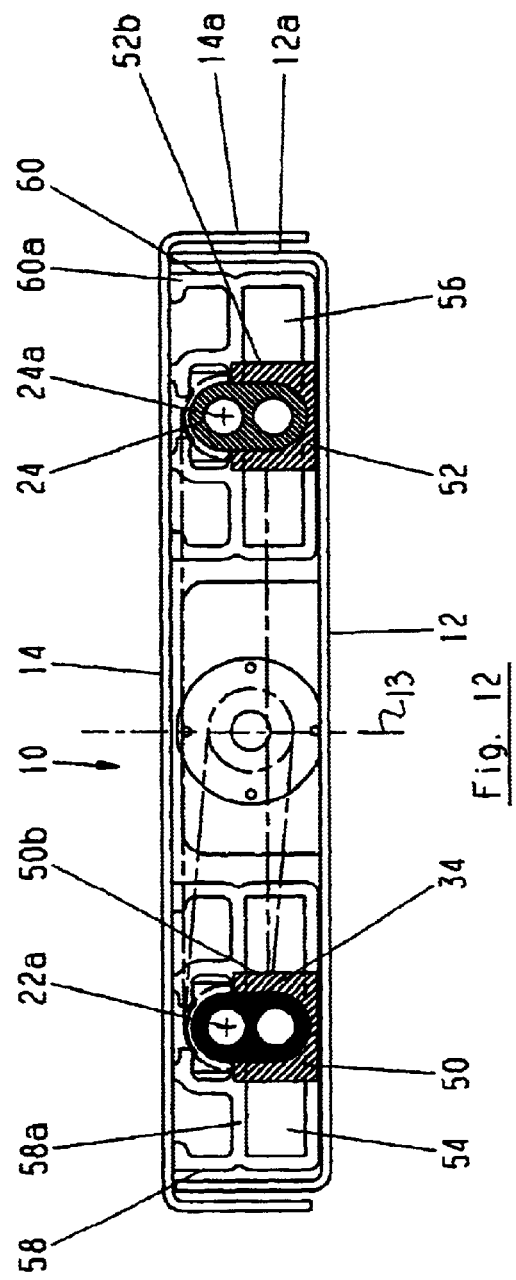

CONVEYOR TRANSFER LIFT BOX

This application incorporates by reference herein in its entirety pending U.S. provisional application Ser. No. 60/240,798, filed Oct. 16, 2000, entitled CONVEYOR TRANSFER LIFT BOX, by Applicant Ricardo Schiesser.

TECHNICAL FIELD AND BACKGROUND OF THE INVENTION

The present invention relates to a lift device and, more particularly, to a self-contained lifting assembly which is especially suitable for use in a transfer assembly of a conveyor system.

Transfer assemblies are typically positioned between two conveyor sections and are adjacent one or more transfer conveyors for selectively transferring loads carried by the conveyor sections to one of the transfer conveyors. Transfer assemblies include a group of conveying components, such as rollers, belts, wheels or the like, which provide a conveying surface for one or more loads and move the loads in a conveying direction between the two conveyor sections. Positioned between one or more of the conveying components are transferring components, such as belts, rollers, wheels or the like, which are oriented such that they move laterally with respect to the conveying direction of the conveying components to selectively transfer a load or loads in a direction lateral to the conveying direction. The transferring components are selectively raised to lift a load (or loads) off the conveying surface of the conveying components to move the load laterally with respect to the conveying surface onto the adjacent transfer conveyor. This is alternately achieved by lowering the conveying components. Typical combinations of conveying components and transferring components in transfer assemblies include: Belts or chains with intermediate rollers or wheels; wheels with intermediate belts, chains, or rollers; or rollers with intermediate belts, chains, or wheels.

When a transfer is to take place, the transferring components are raised by an actuator so that the load or loads are raised above the conveying surface of the conveying components. In the case of conveying components that are lowered, an actuator is used to lower the conveying components so that the load or loads are then deposited on the transferring components. Heretofore, these actuators have typically comprised pneumatic actuators. While pneumatic actuators are relatively inexpensive, they require a source of air and, further, provide an abrupt movement which results in dynamic loading of the various component parts forming the transfer assembly and of the actuator itself.

It is therefore an object of this invention to provide an actuator or lifting device that can provide a smooth lifting and lowering motion and, further, offers a non-pneumatic application, thus, eliminating the need for a supply of air. In addition, in order to offer a lifting device with greater flexibility and, therefore, broader application, there is a need for a lifting device which is compact and preferably modular.

SUMMARY OF THE INVENTION

According to the present invention, a compact modular lifting/lowering device is provided that offers a smooth lifting or lowering motion by moving the support surface at varying speeds to minimize the sudden acceleration and deceleration of the transferring components.

In one form of the invention, a lift assembly for raising and lowering a load includes a first member, which is adapted for resting on a reference surface, and a second member which defines a support surface for supporting a load. A drive assembly selectively moves the second member relative to the first member from an initial position to a final position to raise or lower the second member relative to the first member. The drive assembly is adapted to move the second member from its initial position at a progressively increasing speed to an intermediate position and after which at a progressively decreasing speed until the second member is moved to its final position.

In one aspect, the drive assembly preferably moves the second member relative to the first member at speeds having a sinusoidal profile.

In other aspects, the drive assembly includes a motor and at least one crank arm, which is coupled to the second member. The motor moves the crank arm in a semicircular path to thereby raise or lower the second member relative to the first member at the variable speeds. Preferably, the driver includes at least one driver shaft, with the crank arm being coupled to the driver shaft and the motor driving the driver shaft to thereby move the crank arm.

In further aspects, the drive assembly includes a second driver shaft and a second crank arm which is coupled to the second driver shaft. The second crank arm is coupled to the second member and, further, coupled to the first driver shaft. Thus, when the motor drives the first driver shaft, which in turn drives the second driver shaft, the first and second crank arms are moved in a semicircular path to thereby move the second member.

In another aspect, the first and second members are nested to thereby form a compartment therein. For example, each of the first and second members includes an inwardly depending flange to thereby form the compartment therebetween. In preferred form, the drive assembly is positioned in the compartment and, more preferably, fully contained in the compartment.

In addition, at least one spring may be housed in the compartment, which is in a compressed state when the second member is moved to a retracted position whereby the spring reduces the load on the drive assembly when the drive assembly moves the second member to an extended position.

According to another form of the invention, a lift assembly for raising and lowering a load includes a first member, a second member, and a drive assembly as noted above. The first member and the second member are defined in a compartment therebetween in which the drive assembly is positioned and contained. The drive assembly selectively moves the second member relative to the first member from an initial position to a final position to raise or lower the second member relative to the first member. In addition, the drive assembly includes a motor and a crank arm, which is adapted to move the second member at speeds having a sinusoidal profile wherein the second member moves from the initial at a progressively increasing speed to an intermediate position and after which at a progressively decreasing speed until the second member is moved to its final position.

In other aspects, the motor moves the crank arm in a semicircular path to thereby raise or lower the second member relative to the first member. In further aspects, the drive assembly further includes a guide and a track secured to the second member. The guide is positioned in the track and coupled to the crank arm and moves along the track when the crank arm is moved in its semicircular path thereby moving the second member between its initial and final positions.

In a further aspect, the drive assembly further includes at lease one driver shaft and a pair of crank arms. The crank arms are coupled to the driver shaft with the motor driving the driver shaft to move the crank arms in a semicircular path to thereby move the second member.

According to yet another form of the invention, a lift assembly for raising and lowering a load includes a first member, second member, and a drive assembly as noted above. The drive assembly moves the second member along an axis of extension relative to the first member from an initial position to a final position to raise or lower the second member relative to the first member. The first member is substantially rigidly coupled to the second member in directions lateral to the axis of extension, with the drive assembly being adapted to move the second member in the axis of extension from the initial position at a progressively increasing speed to an intermediate position and after which at a progressively decreasing speed until the second member is moved to its final position. In addition, the drive assembly couples the first member to the second member in the axis of extension.

In further aspects, the drive assembly preferably moves the second member relative to the first member at speeds having sinusoidal profile.

These and other objects, advantages, purposes, and features of the invention will become more apparent from the study of the following description taken in conjunction with the drawings.

BRIEF DESCRIPTION OF THE DRAWINGS

FIG. 5 is a fragmentary plan view of the lifting/lowering assembly of FIGS. 14;

FIG. 5A is a cross-section taken along line VA—VA of FIG. 5;

FIG. 6 is a plan view of a driver shaft of the drive assembly of the lifting/lowering assembly;

FIG. 7 is a side elevation view of the driver shaft of FIG. 6;

FIG. 8 is a plan view of a second driver shaft of the drive assembly;

FIG. 9 is a side elevation view of the driver shaft of FIG. 8;

FIG. 10 is a cross-sectional view taken along line X—X of FIG. 5;

FIG. 11 is a similar view to FIG. 10 illustrating the lifting/lowering assembly in an extended position;

FIG. 12 is a cross-section view taken along line XII—XII of FIG. 5 illustrating the lower shaft supports and upper extrusions of the cover with the lifting/lowering assembly in a lowered position;

FIG. 13 is a cross-section view similar to FIG. 10 illustrating the driver shaft supports, driver shafts, crank arms, and upper extrusions with the lifting/lowering assembly in a partially extended or half-raised position;

FIG. 16 is cross-section view taken along line XVI—XVI of FIG. 5; and

FIG. 17 is a similar view to FIG. 16 illustrating the lifting/lowering assembly in an extended or raised position.

DETAILED DESCRIPTION OF THE PREFERRED EMBODIMENTS

Figure 1:
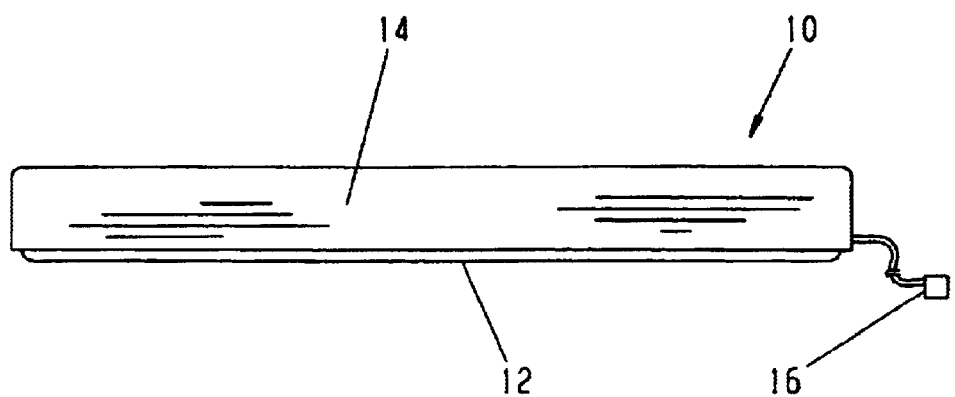
FIG. 1 is a side elevation view of a lifting/lowering assembly of the present invention.
Figure 2:
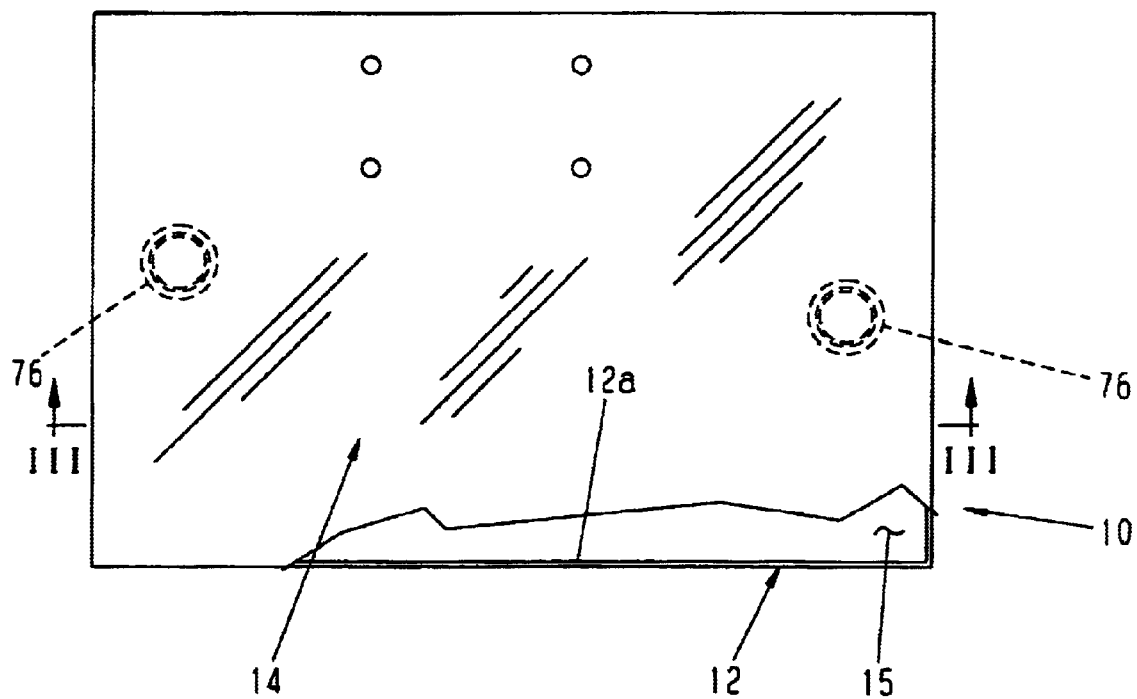
FIG. 2 is a top plan view of the lifting and lowering assembly of FIG. 1.

Referring to FIG. 1, the numeral 10 generally designates a lifting/lowering assembly (hereinafter referred to as lift assembly) or lift box of the present invention. Lift assembly 10 is used for selectively raising or lowering loads. For example, as previously noted, lift assembly 10 is particularly suitable for lifting or lowering transferring components, such as rollers, including power driven rollers, wheels, belts, chains, including padded chains, or the like, of a transfer assembly such as transfer assembly in a conveyor system. Alternately, lifting assembly 10 may be used to lower the conveying components, such as rollers, belts, wheels, chains, or the like. For examples of suitable transfer assembly applications, reference is made to co-pending U.S. patent application entitled CONVEYOR TRANSFER ASSEMBLY, filed May 5, 2000, Ser. No. 09/831,210 (Attorney Docket No. RAP04 P-609, which is has been changed to RAP04 P-581A), and U.S. patent pending application entitled AUTOMATIC TRAY HANDLING SYSTEM FOR SORTER, filed Jul. 31, 2000, Ser. No. 09/629, 009 (Attorney Docket RAP04 P-601), now U.S. Pat. No. 6,561,339, which are incorporated by reference in their entireties. It should be understood that lift assembly 10 may be used in a wide variety of applications including for lifting articles or loads directly or raising or lowering support surfaces for lifting and lowering loads.

Figure 3:
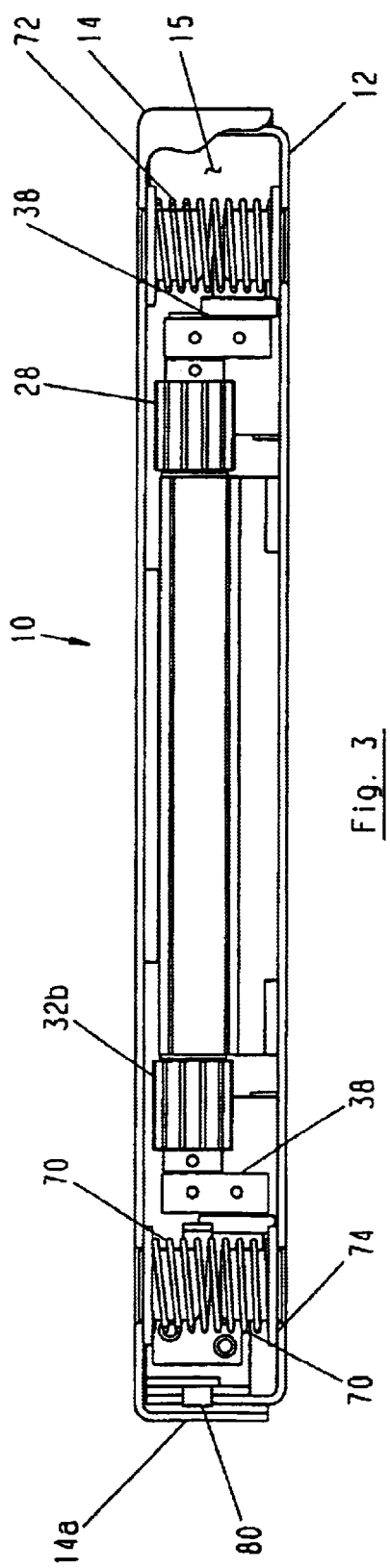
FIG. 3 is a cross section view taken through line III—III of FIG. 2.

Lift assembly 10 includes a base 12 and a cover 14 which nest to form a compact modular box which is a self-contained unit, with the exception of wiring which will be more fully described below. Base 12 and cover 14 are both preferably metal rectangular plates, such as aluminum plates, with inwardly projecting perimeter flanges which form therebetween a space or compartment 15 (FIG. 3). Lift assembly 10 also includes a drive assembly 18 which is housed in compartment 15 and which selectively raises and lowers cover 14 with respect to base 12 in response to control signals generated by a control system 16 (FIG. 1). As will be more fully described in reference to FIGS. 14A and 14B, drive assembly 18 moves cover 14 vertically relative to base 12 in a smooth motion that includes an initial slow motion, an intermediate fast motion, and a final slow motion, which minimizes the impact on the component parts comprising lift assembly 10 and, further, on the components being raised or lowered by lift assembly 10, for example the transfer assembly and the loads being transferred by the transfer assembly.

Figure 4:
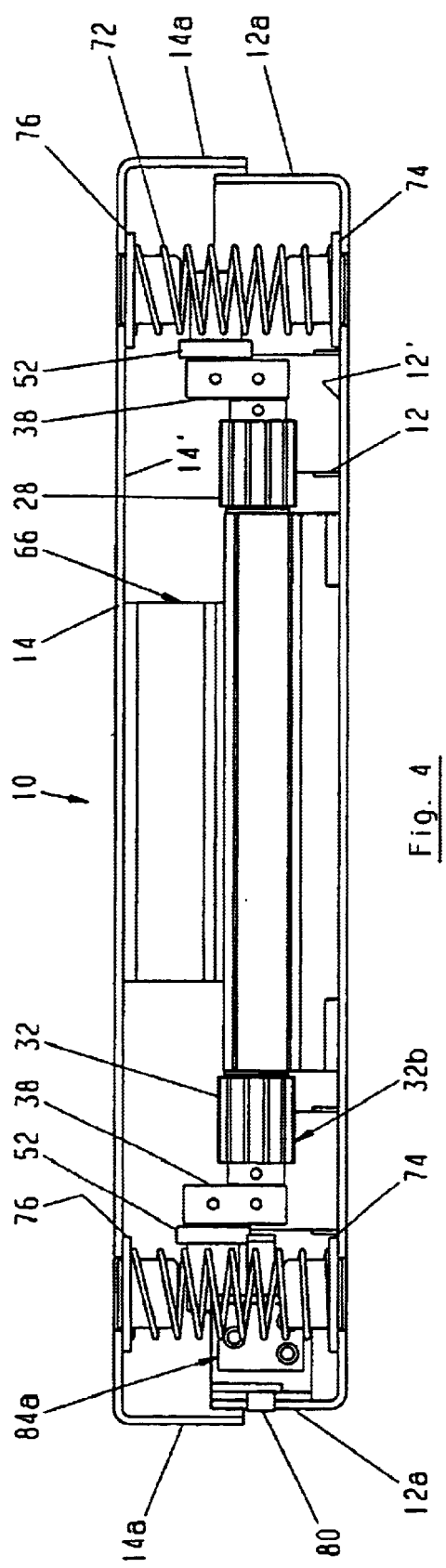
FIG. 4 is a similar cross-section view to FIG. 3 illustrating the lifting/lowering assembly in an extended position.

Referring to FIGS. 3–5, drive assembly 18 includes a motor 20, preferably a motor with gear reduction, and a pair of driver shafts 22 and 24, preferably substantially identical shafts. For example, motor 20 may comprise a 24-volt DC motor with a 159:1 reduction or other which can achieve cycle times in a range of 0.5 seconds to 3 seconds. Motor 20 includes an output drive shaft 26 with a cog pulley 28. Shaft 22 also includes a cog pulley 30a which is drivingly coupled to cog pulley 28 and, therefore, output drive shaft 26 by a cog belt 30. Driver shaft 22 is similarly drivingly coupled to driver shaft 24 by cog belt 32 which extend between and drivingly couples to respective cog pulleys 32a and 32b which are mounted on shafts 22 and 24, respectively. In this manner, when motor output drive shaft 26 rotates, shafts 22 and 24 rotate. Shafts 22 and 24 rotate in unison at the same angular velocity. As best seen in FIGS. 5–9, fixedly coupled at each end of driver shafts 22, 24, are crank arms 34 and 38, respectively, which are used to move cover 14 at speeds having a sinusoidal profile, as will be more fully described below. Thus, crank arms 34 and 38 rotate with shafts 22 and 24.

Each driver shaft 22, 24 is supported and mounted to base 12 by shaft supports 42 and 46, respectively. Shaft supports 42 and 46 are of similar construction. Shaft support 42 includes generally parallel bearing surfaces 42c, and 42d. Shaft supports 42 and 46 contain a cylindrical or tubular member 43a, 43b and are secured to base 12 by flanges 44 and 48, respectively, for example by fasteners, which extend through mounting openings provided in base 12. As best understood from FIG. 5, shaft 22 is journaled in cylindrical passage 43a' of tubular member 43a, while shaft 24 is journaled in cylindrical passage 43b' of tubular member 43b. However, it can be appreciated that flanges 44 and 48a and 48b may be welded or otherwise fixed to base 12. Cog pulleys 30a and 32b are preferably mounted to opposed ends of shaft 22 and positioned on either side of support 42. Cog pulley 30a is preferably positioned between flange 22b of shaft 22 and a collar 22c which is mounted to shaft 22 by set screws or a pin or the like. Similarly, cog pulley 32a is preferably mounted on shaft 22 between flanges 22d and a collar 22e. It can be appreciated that in addition to axially retaining pulleys 30a and 32a on shaft flanges 22b and 22d provide axial restraint for shaft 22 in support 42. Shaft 24 also includes retaining flanges 24b and 24 and a retaining collar 24e for axially retaining cog pulley 32b on shaft 24 and also for axially restraining shaft 24 in support 44.

Figure 14:
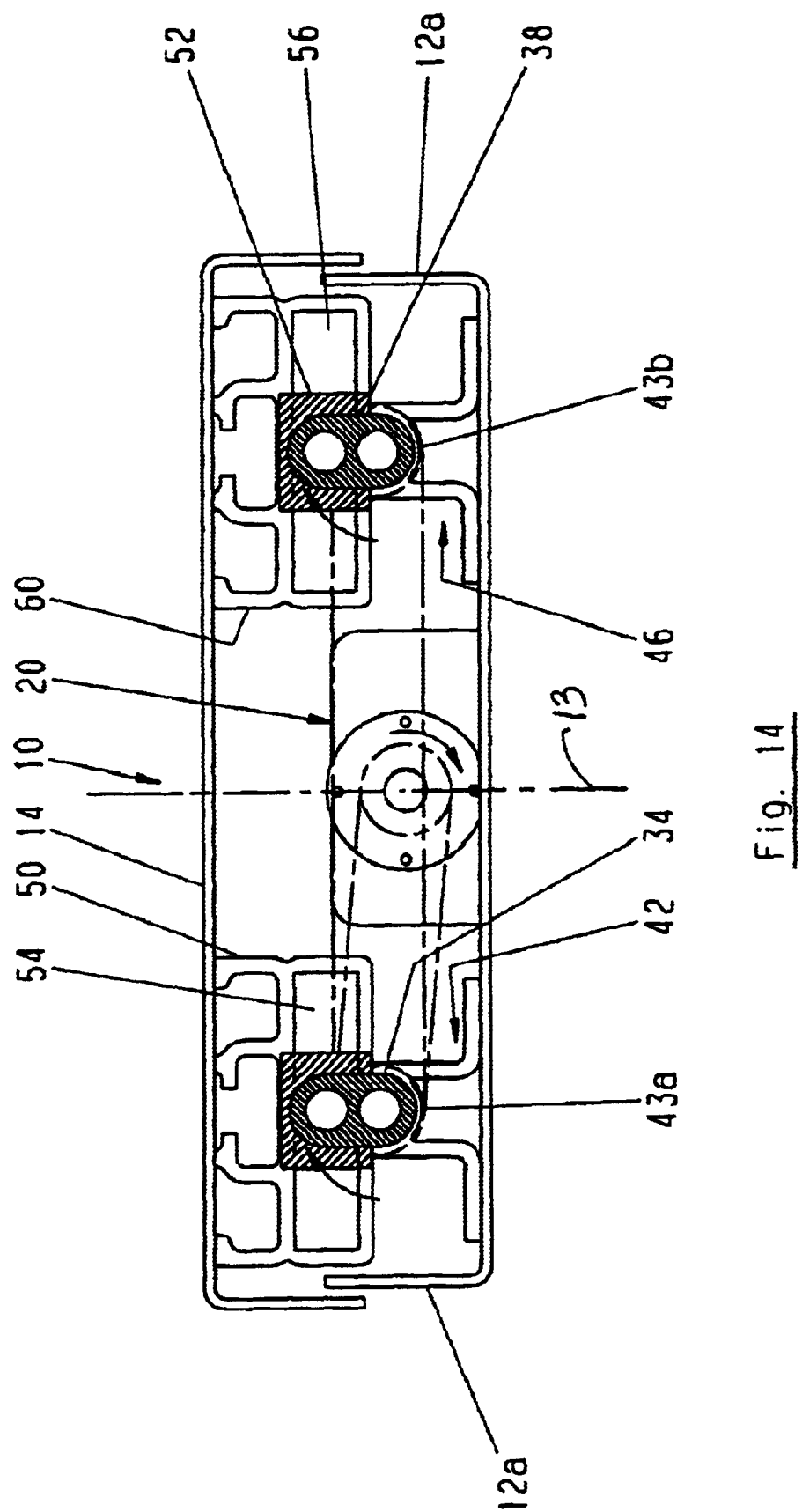
FIG. 14 is a similar view to FIG. 13 with the lifting/lowering assembly in a fully extended position.

As best seen in FIG. 5, crank arms 34 and 38 are coupled to respective guide blocks 50, 52, by pins 50a, 52a. Pins 50a, 50b are journaled in blocks 50, 52, respectively, so that pins 50a and 50b are free to rotate in pins 50a, 50b as crank arms 34 and 38 are moved in their semi-circular or circular path by shafts 22 and 24. Guide blocks 50, 52 are preferably formed from low friction material, such as plastic, including for example an ultra-high molecular weight (UHMW) polyethylene. As best seen in FIGS. 12–14, guide blocks 50, 52 are coupled to cover 14 and preferably captured in elongate tracks 54, 56, respectively, which are provided by extruded members 58, 60. Extruded members 58 and 60 are secured to cover 14, for example by fasteners 58a, 60a. It should be understood that extruded members 58, 60 may alternatively be welded to cover 14 or otherwise formed as a part of cover 14 though such a construction would be less preferred. In the illustrated embodiment, extruded members 58, 60 are secured to cover 14 by fasteners 58a, 60a which extend through mounting openings 14a, 14b provided in cover 14 and which extend into nuts 58b, 60b that are preferably captured in upper tracks or recesses 62 and 64 of extruded members 58, 60, respectively. Extruded members 58, 60 preferably comprise aluminum extruded members, which minimizes the overall weight and overall cost of lifting assembly 10.

Figure 14A:
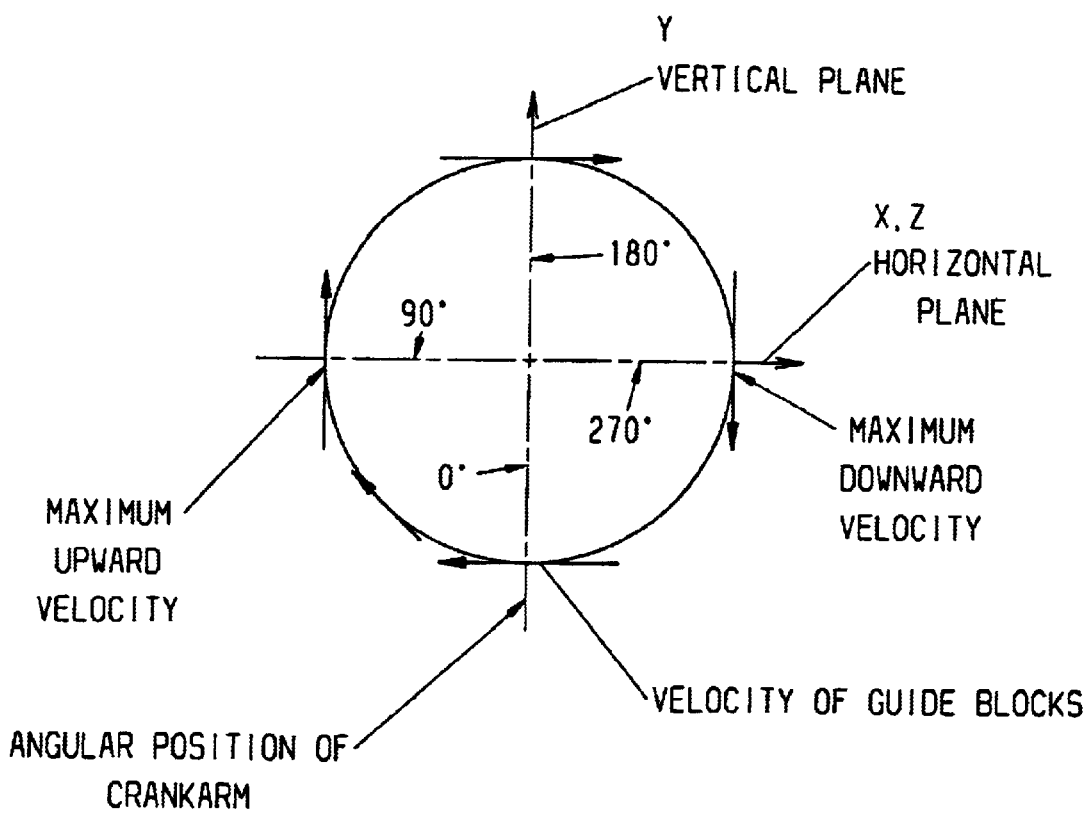
FIG. 14A is a polar graph of the motion of the crank arms of the drive assembly.
Figure 14B:
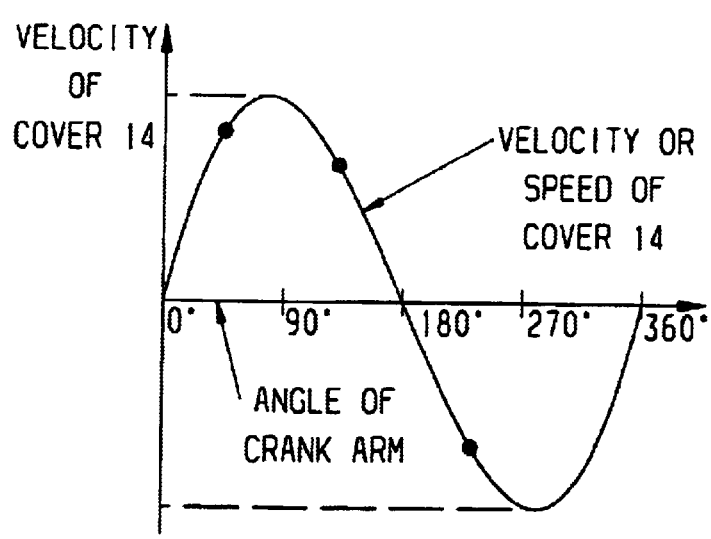
FIG. 14B is a graph of the velocity of the cover member 14 versus angle of the crank arms.
Figure 15:
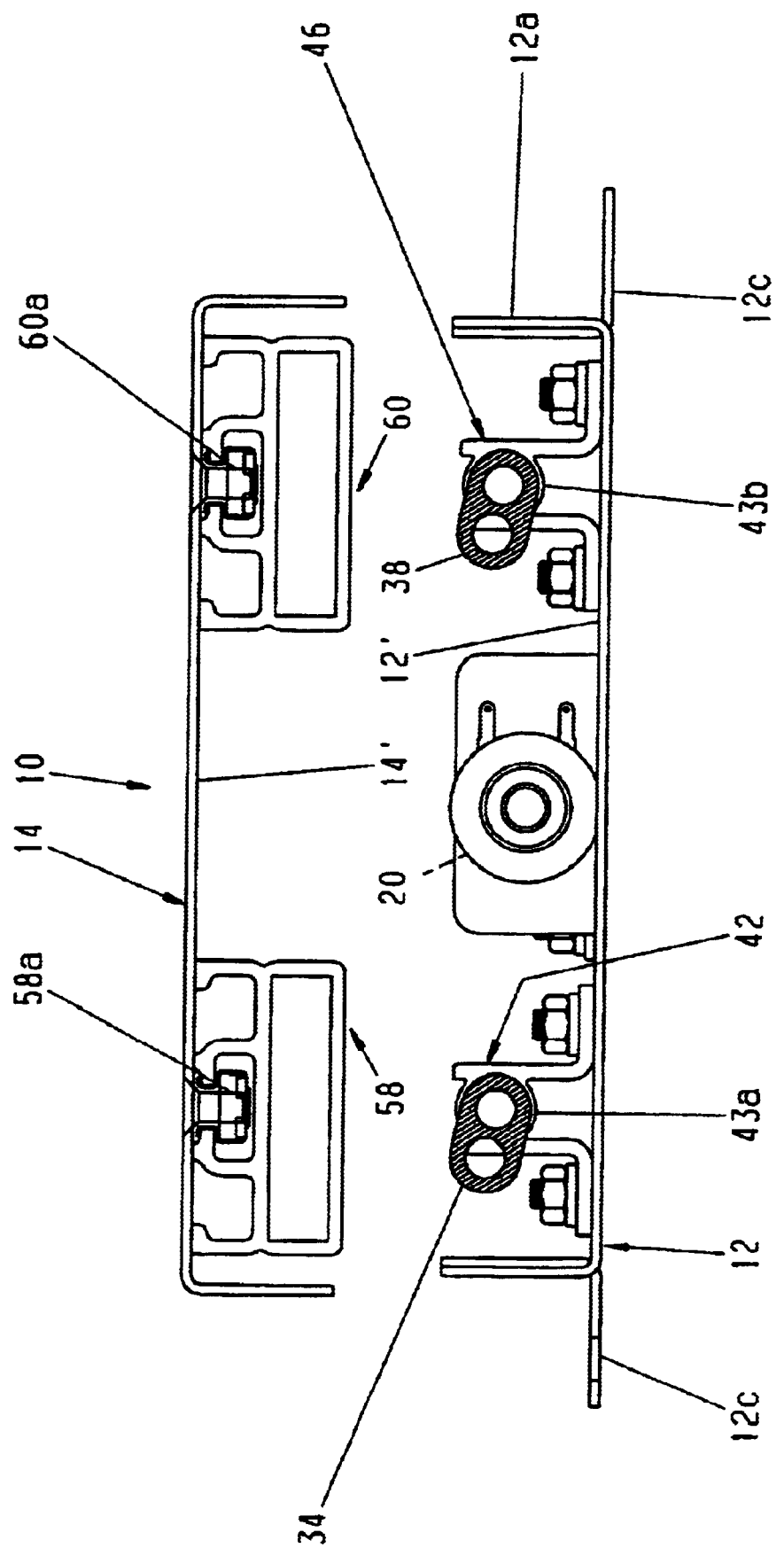
FIG. 15 is an exploded perspective view of the cover and base of the lowering/lifting assembly illustrating the shaft supports, driver shafts, crank arms, and upper extrusions.

As best understood from FIGS. 12–14, as output drive shaft 26 of motor 20 rotates, driver shaft 22 and driver shaft 24 rotate in unison such that crank arms 34 and 38 rotates about respective longitudinal axes 22a, 24a of driver shafts 22, 24 in a given direction (clockwise, for example, as viewed in FIGS. 12–14). As best seen in FIG. 13, when crank arms 34 and 38 rotate to a 90° position, guide blocks 50, 52 translate along tracks 54, 56 and apply vertical forces to extrusions 58, 60 to thereby raise cover 14 with respect to base 12. As shafts 22 and 24 continue to rotate about their longitudinal axes 22a, 24a to a 180° position, guide blocks 50 and 52 translate back to their center position. Referring to FIG. 14A, it can be appreciated, that the vertical velocity of cover 14 is at a maximum when crank arms 34 and 38 are rotated to their 90° positions (as illustrated in FIG. 13). On the other hand, the vertical velocity of cover 14 is essentially zero when cranks 34 and 38 are at their zero positions or 180° positions (as illustrated in FIG. 12 and FIG. 14). But as the crank arms 34 and 38 are moved beyond their zero positions to their 90° positions the vertical velocity of cover 14 increases until it reaches its maximum velocity (which occurs at 90°) after which the velocity decreases again until crank arms 34 and 38 are rotated to their 180° positions. At their zero positions or 180° positions, rotation of driver shafts 22, 24 induces a maximum horizontal velocity in guide blocks 50, 52 with a negligible or zero vertical component. In other words, drive assembly 10 moves cover 14 from its initial position at a progressively increasing speed to an intermediate position (when crank arms 34, 38 reach their 90° positions) and after which at a progressively decreasing speed until cover 14 is moved to its final position (when crank arms 34, 38 reach their 180° positions). When driver shafts 22, 24 are then rotated to their 270° positions, the vertical velocity of cover 14 is again progressively increasing and maximized but in a downward direction. As best seen in FIG. 14B, the velocity of cover 14 can best be represented by a sinusoidal curve.

In order to provide stability to lifting assembly 10, guide blocks 50, 52 each include flange portions 50b, 52b, respectively, which bear against the end 58b and 60b of extruded members 58, 60, respectively, which provide further axial stability of shafts 22, 24 in base 12. In order to provide lateral stability of shafts 22 and 24 in base 12, cover 14 includes a downwardly depending guide member 66. Guide member 66 preferably straddles shaft support 42 of shaft 22 to limit lateral movement of support 42 relative to cover 14. Guide member 66 preferably includes a pair of bearing members 68, which provide contact between guide members 66 and shaft support 42. As best seen in FIG. 16 and 17, guide member 66 includes a pair of spaced apart side members 66a and 66b which preferably support therein bearing members 68. Bearing members 68 preferably comprise low friction round rods or bars, such as plastic, and, may comprise, for example PTFE or ultra-high molecular weight (UHMW) polyethylene or the like. Side members 68a and 68b are interconnected by a mounting flange 68c which is secured to threaded pins or rods 14c, 14d (which extend downwardly from cover 14) by nuts 14e to thereby mount guide member 66 to cover 14. As previously described, when motor 20 is energized and output shaft 26 rotates, shaft 22 rotates in unison with output shaft 26 which in turn drives shaft 24 to rotate in unison with shaft 22. As shafts 22 and 24 rotate, crank arms 34 and 38 move guide block 50 and 52 to raise and lower cover 14. As viewed in FIG. 17, when cover 14 is in its extended position, bearing members 68 slide against parallel bearing surfaces 42c and 42d of side members 42a and 42b of shaft support 42 to provide lateral restraint of cover 14 with respect to base 12 to further enhance the stability of lifting assembly 10. As can be appreciated from the foregoing, cover 14 is, therefore, rigidly coupled to base 12 in both lateral directions by way of drive assembly 10 and, further, coupled to base 12 in the vertical direction by drive assembly 10. Therefore, lift assembly 10 exhibits superb stability even when subjected to lateral loads when lifting or lowering.

Referring to FIG. 5, lifting assembly 10 optionally and preferably includes a plurality of mounting flanges 12c which permit lifting assembly 10 to be anchored to a reference surface, such as a floor, platform, or the like. This is particularly suitable in applications in which lateral forces may occur.

As best seen in FIGS. 3–5, lifting assembly 10 optionally and preferably includes a pair of springs 70 and 72. Springs 70 and 72 are positioned in compartment 15 between driver shafts 22 and 24 and reduce the load on drive assembly 10 and, particularly, motor 20. In preferred form, spring 70 and 72 comprise coil springs which are mounted between base 12 and cover 14 by collars 74 and 76 which are respectively mounted to the inner surfaces 12' and 14' of base 12 and 14. However, it can be appreciated that elastomeric or leaf-type springs or the like may also be used.

In order to actuate lift assembly 10 to move between its retracted and extended positions, motor 20 is coupled to control system 16 via wiring 78, which exits base 12 though a grommet 78a (FIG. 5). Control system 16 selectively delivers power to motor 20 via wiring 78 in response to signals generated either manually or by a computer program or the like. In order to determine the position of cover 14 with respect to base 12, lift assembly 10 includes a pair of proximity detectors or sensors 80 and 82, which are in communication with control system 16 (FIG. 1), for example, by wiring 83a and 83b, which similarly exit base 12 through a grommet 85 provided in upwardly extending flange 12a of base 12. Proximity detectors 80 and 82 may comprise photo-eyes, hall effect detectors, and also mechanical detectors or the like. As best seen in FIG. 5, proximity detector 80 is mounted to upwardly extending flange 12a of base 12 by a support 84 and is positioned such that when base 12 is raised to its extended position (as seen in FIG. 4) downwardly depending flange 14a of cover 14 moves above proximity detector 80, which triggers a signal to control system 16 to indicate that the cover 14 is in its extended or upward position. Support 84 includes a mounting bracket 84a and a clamp 84b, which is secured to mounting bracket 84a and includes a longitudinal receiving passage 84c for receiving and holding proximity detector 80 therein.

Proximity detector 82 is preferably mounted to shaft support 46 by a support 88. Support 88 similarly includes a clamp 88a, which includes an elongate passage 88b for receiving and holding proximity detector 82, and a pair of mounting bolts 90a and 90b which extend through side members 46a and 46b of support 46 to thereby mount clamp 88a to support 46 and position proximity sensor 82 adjacent shaft 24. Mounted on shaft 24 are a pair of pins 92, preferably elastic pins. Pins 92 are mounted on shaft 24 by a bushing 94 which is secured to shaft 24 by a pair of set screws 96 which extend through mounting openings 98 on bushing 94. In this manner, the position of flexible pins 92 may be adjusted as needed. Support 88 positions proximity sensor 82 such that proximity detector 82 aligns with one of the pins (92). Thus, when shaft 24 rotates pin 92 is no longer aligned with proximity detector 82, which triggers a signal after shaft 24 makes a full 180° turn the second pin will align with proximity detector 82, thus, ending the signal to provide an indication of when the shaft 24 has made a full 180° rotation. In this manner, proximity detector may be used to generate signals to control system 16 so that control system 16 can know when cover 14 is fully extended or fully retracted and selectively stop cover 14 either at its extended position or its retracted position. In this manner, proximity detector 82 may act as a shut off switch for lift assembly 10. It should be understood, that where control system 16 includes a memory and can track the position of cover 14 with respect to base 12, proximity detector 80 may be eliminated.

The present invention provides a compact, generally self-contained lift box which includes a lower half that forms a base and an upper half that forms a cover and moving support surface. The lift box can be quickly positioned for use, for example, under the transferring components or conveying components of a transfer assembly as previously mentioned and by the same token quickly removed for replacement, adjustment, or repair. In addition, given the modular design of the lift box, the various components comprising the lift box may be adjusted to suit the particular application. For example, springs 70, 72 may be removed and replaced with springs having larger or smaller capacity or eliminated in their entirety. The size of the motor may be increased or decreased. In addition, the reduction gearing may be varied to increase or decrease speed. Furthermore, the crank arms 34, 38 may be removed and replaced with crank arms having longer lengths to increase the stroke of the lift box. Thus, the present invention provides a modular design which can be adjusted to increase or decrease the load capacity. Furthermore, the design of the components may be such (as shown in the FIGS. used herein) that the motor does not require reversal in order to achieve the up and down motion of the lift box upper member, which prolongs the life of the motor and reduces the cost of the controls. However, it should be understood that with other configurations, for example in more compact arrangements, the motor reversal may be desirable. In addition, the lift box is assembled in manner to permit easy disassembly for repair, replacement, or upgrade. For example, the four fasteners (58a and 60a) can be removed so that cover 14 may be lifted off base 12 to provide quick access to cavity 15. Furthermore, given the arrangement of the shafts and motor, the overall height of the assembly may be minimized. For example, the lift box may have a height dimension of approximately 34 mm with a stroke of 20 mm such that the height of the box is 54 mm at its extended position. As previously noted, the present application is particularly suitable for use in transfer assemblies and may be used to move group of chains, belts, rollers, including driven rollers, wheels or the like. Thus, the all electric lift box requires a far less complicated procedure to install than conventional actuators, is suitable for high volume production, and can achieve cycle times on the order of 0.5 to 3 seconds.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow as interpreted under the principles of patent law including the doctrine of equivalents.

I claim:

1. A lift assembly for raising and lowering a load, said lift assembly comprising:

a first member adapted for resting on a reference surface;

a second member defining a support surface for supporting a load, said support surface being spaced from said first member along an axis of extension;

a drive assembly selectively moving said second member relative to said first member along said axis of extension from an initial position to a final position to raise or lower said second member relative to said first member, said drive assembly being adapted to move said second member from said initial position at a progressively increasing speed to an intermediate position and after which at a progressively decreasing speed until said second member is moved to said final position; and at least one spring mounted between said first member and said support surface, said spring being in a compressed state when said second member is in said initial position whereby said spring reduces the load on said drive assembly when said drive assembly moves said second member to at least said intermediate position.

2. The lift assembly according to claim 1, wherein said drive assembly moves said second member relative to said first member at speeds having a sinusoidal profile, said speeds including said progressively increasing and decreasing speeds.

3. The lift assembly according to claim 1, wherein said drive assembly includes a motor and at least one crank arm, said crank arm being coupled to said second member, and said motor moving said crank arm in a circular path through 360° to thereby raise and lower said second member relative to said first member at said progressively increasing and decreasing speeds.

4. The lift assembly according to claim 3, wherein said drive assembly includes at least one driver shaft, said crank arm being coupled to said driver shaft, and said motor driving said driver shaft to thereby move said crank arm.

5. A lift assembly for raising and lowering a load, said lift assembly comprising:
a first member adapted for resting on a reference surface;
a second member defining a support surface for supporting a load; and
a drive assembly selectively moving said second member relative to said first member from an initial position to a final position to raise or lower said second member relative to said first member, said drive assembly including a motor and at least one crank arm, said crank arm being coupled to said second member, said motor moving said crank arm in a semi-circular path, said drive assembly further including at least one driver shaft, said crank arm being coupled to said driver shaft, and said motor driving said drive shaft to thereby move said crank arm, said driver shaft comprising a first driver shaft, said drive assembly including a second driver shaft and a second crank arm coupled to said second driver shaft, said second crank arm coupled to said second member, said first driver shaft drivingly coupled to said second driver shaft, and said motor driving said first driver shaft thereby driving said second driver shaft to move said first and second crank arms in said semicircular path to thereby move said second member, wherein said drive assembly moves said second member from said initial position at a progressively increasing speed to an intermediate position and after which at a progressively decreasing speed until said second member is moved to said final position.

6. The lift assembly according to claim 1, wherein said first member and said second member are nested to thereby form a compartment therein.

7. The lift assembly according to claim 6, wherein each of said first member and said second member includes inwardly depending flanges forming said compartment therebetween.

8. The lift assembly according to claim 6, wherein said drive assembly is positioned in said compartment.

9. The lift assembly according to claim 6, wherein said drive assembly is fully contained in said compartment.

10. A lift assembly for raising and lowering a load, said lift assembly comprising:
a first member adapted for resting on a reference surface;
a second member defining a support surface for supporting a load, said first member and said second member defining a compartment therebetween; and
a drive assembly positioned and contained in said compartment, said drive assembly selectively moving said second member relative to said first member from an initial position to a final position to raise or lower said second member relative to said first member, said drive assembly including a motor and a crank arm, said motor moving said crank arm in a semicircular path to thereby raise or lower said second member relative to said first member wherein said crank arm moves said second member at speeds having a sinusoidal profile wherein said second member moves from said initial position at a progressively increasing speed to an intermediate position and after which at a progressively decreasing speed until said second member is moved to said final position, said drive assembly further including a guide and a track secured to said second member, said guide being positioned in said track and coupled to said crank arm, said guide moving along said track when said crank arm is moved in said semi-circular path and moving said second member between said initial and final positions.

11. The lift assembly according to claim 10, wherein said drive assembly further includes at least one driver shaft and a pair of said crank arm, said crank arms being coupled to said driver shaft, said motor driving said driver shaft to move said crank arms in said semicircular path to thereby move said second member.

12. The lift assembly according to claim 11, wherein each of crank arms couples to a respective guide, said respective guides being positioned in respective tracks, said respective tracks being mounted to said second member whereby said respective guides move said second member when said crank arms move in their respective semi-circular paths.

13. The lift assembly according to claim 12, wherein said crank arms are positioned at opposed ends of said driver shaft, each of said guides including a retaining flange, and said retaining flanges axially restraining said shaft in said compartment and, further, providing lateral restraint to said second member relative to said first member.

14. The lift assembly according to claim 12, further comprising a shaft support, said driver shaft being journaled in said shaft support, said shaft support mounting said shaft to said first member.

15. The lift assembly according to claim 14, further comprising a shaft support guide mounted to said second member, said shaft support guide providing lateral support to said shaft support to thereby increase the stability of said lift assembly.

16. The lift assembly according to claim 13, wherein said first member and said second member are nested to thereby form said compartment therebetween.

17. The lift assembly according to claim 16, wherein each of said first member and said second member includes inwardly depending flanges forming said compartment therebetween.

18. The lift assembly according to claim 13, further comprising at least one spring housed in said compartment, said spring being in a compressed state when said second member is moved to a retracted position whereby said spring reduces the load on said drive assembly when said drive assembly moves said second member to an extended position.

19. The lift assembly according to claim 18, wherein said spring comprises a coil spring.

20. A lift assembly for raising and lowering a load, said lift assembly comprising:

a first member adapted for resting on a reference surface;

a second member defining a support surface for supporting a load, said support surface spaced from said first member along an axis of extension; and a drive assembly comprising a pair of driver shafts, each of said driver shafts having at least one crank arm, said crank arms coupled to one of said first member and said second member for selectively moving said second member along said axis of extension relative to said first member from an initial position to a final position to raise or lower said second member relative to said first member, said first member being substantially rigidly coupled to said second member in directions lateral to said axis of extension, said drive assembly being adapted to move said second member in said axis of extension from said initial position at a progressively increasing speed to an intermediate position and after which at a progressively decreasing speed until said second member is moved to said final position, and said drive assembly coupling said first member to said second member in said axis of extension.

21. The lift assembly according to claim 20, wherein said drive assembly moves said second member relative to said first member at speeds having a sinusoidal profile, said speeds including said progressively increasing and decreasing speeds.

22. The lift assembly according to claim 21, wherein said drive assembly includes a motor, and said motor driving said driver shaft to move said crank arm in a semi-circular path to thereby raise or lower said second member relative to said first member at said progressively increasing and decreasing speeds.

23. The lift assembly according to claim 20, wherein said first member and said second member are nested to thereby form a compartment therein.

24. The lift assembly according to claim 23, wherein each of said first member and said second member includes inwardly depending flanges forming said compartment therebetween.

25. The lift assembly according to claim 23, wherein said drive assembly is contained in said compartment.

26. The lift assembly according to claim 23, further comprising at least one spring housed in said compartment, said spring being in a compressed state when said second member is moved to a retracted position whereby said spring reduces the load on said drive assembly when said drive assembly moves said second member to an extended position.

27. A lift assembly for raising and lowering a load, said lift assembly comprising:

a first member adapted for resting on a reference surface;

a second member defining a support surface for supporting a load; and a drive assembly selectively moving said second member along an axis of extension relative to said first member from an initial position to a final position to raise or lower said second member relative to said first member, said first member being substantially rigidly coupled to said second member in directions lateral to said axis of extension, said drive assembly including a motor, at least one crank arm, and at least one driver shaft, said crank arm being coupled to said second member and being coupled to said driver shaft, said motor driving said driver shaft to thereby move said crank arm in a semi-circular path to thereby raise or lower said second member relative to first member at speeds having a sinusoidal profile wherein said drive assembly moves said second member in said axis of extension from said initial position at a progressively increasing speed to an intermediate position and after which at a progressively decreasing speed until said second member is moved to said final position, said drive assembly further including a guide and a track secured to said second member, said guide being positioned in said track and coupled to said crank arm, said guide moving along said track when said crank arm is moved in said semi-circular path and moving said second member between said initial and final positions, and said drive assembly coupling said first member to said second member in said axis of extension.

28. The lift assembly according to claim 27, further comprising a shaft support, said shaft being journaled in said support, said shaft support mounting said shaft to said first member.

29. The lift assembly according to claim 28, further comprising a shaft support guide mounted to said second member, said shaft support guide providing lateral support to said shaft support to thereby increase the stability of said lift assembly.

* * * * *